United States Patent [19]
Koyanagi et al.

[11] 3,852,421
[45] Dec. 3, 1974

[54] EXCIPIENT AND SHAPED MEDICAMENTS PREPARED THEREWITH

[75] Inventors: Shunichi Koyanagi; Kinya Ogawa; Yoshiro Onda, all of Niigata-ken; Akira Yamamoto, Naoetsu, all of Japan

[73] Assignee: Shinetsu Chemical Company, Tokyo, Japan

[22] Filed: Sept. 20, 1971

[21] Appl. No.: 182,226

Related U.S. Application Data

[63] Continuation-in-part of Ser. No. 80,203, Oct. 12, 1970, abandoned.

[30] Foreign Application Priority Data
Mar. 23, 1970 Japan............................... 45-24203

[52] U.S. Cl................. 424/94, 424/280, 424/361, 424/362, 260/231
[51] Int. Cl............................................. A61j 3/10
[58] Field of Search............ 424/361, 362; 260/231

[56] References Cited
UNITED STATES PATENTS
2,851,453  9/1958  Kennon et al. ..................... 260/232

3,424,842  1/1969  Nurnberg............................ 424/94
3,679,794  7/1972  Bentholm et al. .................. 424/148

OTHER PUBLICATIONS

GA. 75 number 40419Y (1971).
GA. 75 number 25412X (1971).
GA. 75 number 40356A (1971).
GA. 71 number 42248h (1969).
GA. 69 number 61529A (1968).

*Primary Examiner*—Shep K. Rose
*Attorney, Agent, or Firm*—Bierman & Bierman

[57]  ABSTRACT

The excipient comprises hydroxy alkyl cellulose or hydroxy alkyl alkyl cellulose, wherein the average number of substituted moles of hydroxy group in glucose per anhydrous glucose unit is from 0.1 to 1.30; the average number of substituted moles of hydroxyalkyl groups per anhydrous glucose unit is from 0.05 to 1.00; and the average number of substituted moles of alkyl groups per anhydrous glucose unit is from 0 to 1.00. When the excipient is mixed with a medicament and the resultant mixture is compressed, hard, readily disintegratable tablets are produced.

7 Claims, No Drawings

EXCIPIENT AND SHAPED MEDICAMENTS PREPARED THEREWITH

This application is a continuation in part application of copending application Ser. No. 80203, filed Oct. 12, 1970 now abandoned, which claims the priority of Japanese applications 44-83102 of Oct. 17, 1969 and 45-24203 of Mar. 23, 1970.

This invention relates to an excipient for shaping medicaments into a solid body that is readily disintegrated in the human body, a method for producing such readily disintegratable solid bodies and to the readily disintegratable solid medicament containing bodies that are produced with said excipient.

In shaping medicaments into tablets, pills, granules or pellets, a certain amount of a medicament is usually mixed with one or more kinds of additives which function as a shaping agent, a binding agent or a disintegrating agent. The additives which are known in the art all have faults. No satisfactory additives have as yet been discovered. For example, starch and micro-crystalline cellulose which are primarily employed as shaping agents will not work as disintegrating agents unless they are used in a large quantity relative to the quantity of the medicament. In the case of tablets, the increase in the relative amount of such substances not only reduces tablet hardness and causes sticking, but also makes necessary an increase in tablet size. This makes it difficult to swallow the tablets. Gelatin cannot be used in shaping white or pale-colored tablets, because its color is not pure white. Moreover, disintegrating agents such as sodium or calcium salts of carboxymethylcellulose or cellulose glycollic acid and its calcium salt, which are employed together with the shaping agent, exemplified by the above-mentioned starch, microcrystalline cellulose and gelatin, or hydroxypropyl starch, methylcellulose, hydroxypropyl cellulose, and polyvinylpyrrolidone, remarkably reduce the hardness of the tablets. Moreover, because of their acidity or dissociating property, they may, depending on the kind of medicament employed, react with the medicament, thereby deteriorating its medicinal property. Thus, they do not possess a wide range of application. It has been recently proposed to use a methyl cellulose having a low degree of substitution. However, it is difficult to completely remove the large quantity of sodium chloride produced as a by-product in the production of this material. The chloride ion, arising from this sodium chloride, inevitably corrodes the manufacturing apparatus and reacts with the medicament, thereby deteriorating its properties. These are serious disadvantages.

An object of the present invention is to provide an excipient and a method, free from the faults hitherto observed, for preparing shaped medicaments which readily disintegrate in the human body. The present is characterized by mixing with the medicaments an excipient comprising hydroxyalkyl cellulose or hydroxyalkyl alkyl cellulose in which the number of hydroxyalkyl radical-substituted moles per glucose unit is in the range of from 0.05 to 1.00.

The instant invention was made, based on our observations that ordinary hydroxyalkyl cellulose or hydroxyalkyl alkyl cellulose hitherto used as a binder is soluble in water. Therefore when in the course of disintegration medicaments containing it come in contact with water, the cellulose ether on the surface of the shaped medicaments dissolves in the water, starchifies, and forms a film which acts to prevent further penetration of water into the inner part of the shaped medicaments. Consequently, it takes a long time for the shaped medicaments to disintegrate. In contrast thereto, hydroxyalkyl cellulose or hydroxyalkyl alkyl cellulose, in which the number of hydroxyalkyl radical-substituted moles per glucose unit is within the above-disclosed range is insoluble or barely soluble in water. Therefore, water easily penetrates into a shaped medicament containing it as a binder, causing it to swell. This helps to rapidly disintegrate the shaped medicament. Furthermore, such hydroxyalkyl cellulose, because it contains hydroxyl radical in its molecule, imparts to the shaped medicaments a high degree of hardness that is not attainable with other cellulose ethers. This accounts for the fact, as discovered by the present inventors, that these materials work both as an excellent shaping agent and as a binder.

The hydroxyalkyl cellulose and/or hydroxyalkyl alkyl cellulose employed in the present invention is exemplified by hydroxyethyl cellulose hydroxypropyl cellulose, hydroxybutyl ethylcellulose, hydroxybutyl methylcellulose, hydroxypropyl ethylcellulose, hydroxypropyl methylcellulose, hydroxyethyl ethylcellulose, hydroxyethyl methylcellulose, and mixtures thereof. In order to attain the objects of the instant invention, the average number of substituted moles of hydroxyalkyl and alkyl groups in glucose per anhydrous glucose unit should be from 0.1 to 1.30, preferably from 0.2 to 1.0; the average number of substituted moles of hydroxyalkyl groups per anhydrous glucose unit should be from 0.05 to 1.00, preferably from 0.10 to 0.80; and the average number of substituted moles of alkyl groups per anhydrous glucose unit should be from 0 to 1.00, preferably less than 0.80.

For the purpose of attaining the object of the invention more advantageously, the particle size of at least 90% by weight of the hydroxyalkyl cellulose or hydroxyalkyl alkylcellulose should be at most $100\mu$, or more preferably at most $80\mu$, with the apparent density thereof being from 0.3 to 0.8 g/cc, or more preferably from 0.5~0.8 g/cc. It is advisable to mix such hydroxyalkyl cellulose or hydroxyalkyl alkylcellulose with the medicaments and shape the mixture thus obtained by the dry and direct compression method. The resultant shaped products will be superior in gloss, hardness and disintegration, and will hardly suffer any abrasion.

The cellulose ethers employed in the practice of the invention are prepared by the well-known conventional method which consists of (i) dipping pulp in a 10–30% aqueous solution of caustic soda and pressing it into alkali cellulose, (ii) charging the alkali cellulose together with alkylene oxide into a reactor and reacting same therein at 20–50°C and under pressure, for 2–5 hours, (iii) thereafter neutralizing by washing the hydroxyalkyl cellulose or hydroxyalkyl alkylcellulose thus prepared with alkali, (iv) then further washing the neutralized hydroxyalkyl cellulose or hydroxyalkyl alkylcellulose with water and pulverizing it, or cooling to 0°–10°C the neutralized hydroxyalkyl cellulose or hydroxyalkyl alkylcellulose containing from 30 to 70% of water, drying it, then pulverizing it. In order to make its particle size and apparent density as given above, the pulverized cellulose ether may be further ground by means of a device such as an atomizer. Hydroxyalkyl cellulose or hydroxyalkyl alkylcellulose powder thus prepared is an extremely inexpensive substance. It is white, odorless, and contains no harmful matter. Therefore, it is quite free from all the faults observed of the conventional binders.

The shaping of the medicaments in accordance with the present invention may be carried out by prior art known methods excepting that the above-mentioned cellulose ether powder is employed. The cellulose ether is added to the medicament in the ratio of from 1 to 50%, preferably from 10 to 30% based on the weight of the solid dosage form. The mixture may then be shaped into tablets, pills or granules by such known methods, as the dry method, the wet method, etc. The disintegration time of the shaped medicament can be controlled at will, irrespective of the nature of the medicament, by varying the quantity of the cellulose ether powder employed within the prescribed range. When mixing the cellulose ether and the medicament, lubricating and polishing agents such as, for example, talc, wax or a metallic salt of stearic acid may be added. One may also add along with the lubricating and polishing agents, known shaping or binding agents, e.g., lactose, starch, cane sugar, gum arabic, tragacanth gum, gelatin, water and alcohol, in amounts such as will not deteriorate the properties of said cellulose ether.

In the examples given below, parts and % are all parts and % by weight. The apparent density of the cellulose ether powder, the disintegration (given in time) and the hardness of the tablets were measured under the following conditions.

Apparent density:

50 g of the sample (cellulose ether powder) was put in a 250 cc measuring cylinder, and shaken in a shaker for 3 minutes. The cubic volume (cc) of the sample in the cylinder was then measured and the value obtained was employed in calculating the apparent density of the sample.

Disintegration:

Disintegration of a tablet prepared of the medicament and the cellulose ether powder was measured by General Test Method 25 of the Japanese Pharmacopeia.

Hardness:

A tablet like the one given above was put between two plates and compressed. The pressure immediately before the tablet was disintegrated was determined by the Monsanto hardness tester and was employed to denote its hardness.

It should be noted that as used in the examples the abbreviation M.S. means the average number of moles of the respective radical combined with the cellulose per anhydroglucose unit.

EXAMPLE 1.

i. Hydroxypropyl cellulose (HPC, M.S.:0.4), having an apparent density of 0.55, at least 95% of which had a particle size of $74\mu$ or less, the number of hydroxypropyl radical-substituted moles per glucose unit being 0.4, and (ii) starch were each mixed with the other ingredients given in Table 1. The mixtures were tableted by dry and direct compression method (pressure : 300 kg/cm$^2$) into tablets whereby Samples 1 and 2 were respectively obtained. The average disintegration time and hardness of these samples were as given in Table 2.

Table 1

| Sample No. | 1 (Present invention) | 2 (Control) |
|---|---|---|
| Bromvaleryl urea | 200 mg | 200 mg |
| Lactose | 40 do. | 40 do. |
| Starch | 0 | 112 do. |
| Carbowax 6,000 | 6 mg | 6 do. |
| HPC, M.S.: 0.4 | 112 do. | 0 |
| Total weight (per tablet) | 358 mg | 358 mg |

(*Trade mark for a lubricating and polishing agent manufactured by Union Carbide Corporation.)

Table 2

| Sample No. | 1 | 2 |
|---|---|---|
| Hardness (kg) | 9 kg | 7 kg |
| Average disintegration time | 25 sec | 5 min. or over |

EXAMPLE 2.

(i) Hydroxypropyl cellulose (HPC, M.S.:3.2), having an apparent density of 0.45 g/cc, at least 90% of which had a particle size of $250\mu$ or less, the number of hydroxypropyl radical-substituted moles per glucose unit being 3.2, and (ii) hydroxypropyl cellulose (HPC, M.S.:0.7), having an apparent density of 0.60 g/cc, at least 95% of which had a particle size of $74\mu$ or less, the number of hydroxypropyl radical-substituted moles per glucose unit being 0.7, were each mixed with the other ingredients given in Table 3, and tableted by dry and direct compression method (pressure: 500 kg/cm$^2$), into tablets, whereby Samples 3 and 4 were obtained. The average disintegration time and hardness of these samples were as given in Table 4.

Table 3

| Sample No. | 3 (Present invention) | 4 (Control) |
|---|---|---|
| Vitamin C | 100 mg | 100 mg |
| Lactose | 100 do. | 100 do. |
| Magnesium stearate | 1 do. | 1 do. |
| HPC, M.S.: 3.2 | 0 | 20 do. |
| HPC, M.S.: 0.7 | 20 do. | 0 do. |
| Total weight (per tablet) | 221 mg | 221 mg |

Table 4

| Sample No. | 3 | 4 |
|---|---|---|
| Hardness (kg) | 9 kg | 8 kg |
| Average disintegration time | 40 Sec | 5 min. or over |

EXAMPLE 3.

(i) Hydroxyehtyl cellulose (HEC, M.S.:0.3), having an apparent density of 0.60 g/cc, at least 95% of which had a particle size of $74\mu$ or less, the number of hydroxyethyl radical-substituted moles per glucose unit being 0.3, and (ii) calcium salt of carboxymethyl cellulose (CMC-Ca), having an apparent density of 0.80 g/cc, at least 90% of which had a particle size of $100\mu$ or less, were each mixed with the other ingredients given in Table 5, and tableted, respectively, by dry and direct compression method (pressure : 350 kg/cm$^2$), whereby Samples 5 and 6 were obtained. The properties of these samples are given in Table 6.

Table 5

| Sample No. | 5 (Present invention) | 6 (Control) |
|---|---|---|
| Pancreatin | 300 mg | 300 mg |
| Cholic acid | 24 do. | 24 do. |
| Calcium stearate | 1 do. | 1 do. |
| HEC, M.S.: 0.3 | 20 do. | 0 |
| CMC-Ca | 0 | 20 do. |
| Total weight (per tablet) | 345 mg | 345 mg |

Table 6

| Sample No. | 5 | 6 |
|---|---|---|
| Hardness (kg) | 12 kg | 6 kg |
| Average Disintegration time | 50 sec | 2 min. 20 sec. |

EXAMPLE 4.

(i) Hydroxypropyl cellulose (HPC, M.S.:0.25), having an apparent density of 0.53 g/cc, at least 95% of which had a particle size of 74μ or less, the number of hydroxypropyl radical-substituted moles per glucose unit being 0.25, and (ii) methyl cellulose (MC, M.S.:0.5), having an apparent density of 0.53 g/cc, at least 95% of which had a particle size of 74μ or less, the degree of methoxy radical substitution being 0.5, were each mixed with the other ingredients given in Table 7, and tableted, respectively by dry and direct compression method (pressure : 300 kg/cm²). Samples 7 and 8 were thereby obtained. The properties of these samples were as given in Table 8.

Table 7

| Sample No. | 7 | 8 |
|---|---|---|
| Mephenesin | 202 mg | 200 mg |
| Polyethylene glycol 400 | 50 do. | 50 do. |
| Carbowax 600 | 1 do. | 1 do. |
| HPC, M.S.: 0.25 | 100 do. | 0 |
| MC, M.S.: 0.5 | 0 | 100 do. |
| Total weight (per tablet) | 351 mg | 351 mg |

Table 8

| Sample No. | 7 | 8 |
|---|---|---|
| Hardness (kg) | 15 kg | 7 kg |
| Average Disintegration time | 1 min. | 1 min. 30 sec. |

EXAMPLE 5.

Hydroxyethyl methylcellulose (M.S. of hydroxyethyl radical: 0.25, and M.S. of methoxyl group: 0.25, and exhibiting when dissolved in an amount of 2 to 10% aqueous solution of sodium hydroxide a viscosity of 10 cps. at 20°C), was pulverized on a high-speed hammer mill. Three kinds of samples were thereby obtained — No. 9 (subjected to one pulverizing), No. 10 (subjected to two pulverizings), and No. 11 (subjected to three pulverizings), as given in Table 9.

250 parts of pancreatin, 7 parts of polyvinylpyrrolidone, and 1 part of calcium stearate were added to 42 parts of each of the samples and to 42 parts of microcrystalline cellulose as a control. The resultant mixtures were uniformly mixed, and tableted by means of a direct compression-type tableting machine (pressures: 200 kg/mm²) into 300 mg tablets. The average disintegration time and hardness of the tablets were as given in Table 9.

Table 9

| Sample No. | | Present Invention 9 | 10 | 11 | Control 12 |
|---|---|---|---|---|---|
| Apparent density | (g./cc) | 0.43 | 0.48 | 0.55 | |
| Particle size Distribution (%) | Over 246μ | 1.5 | 3.5 | | |
| | 246–100μ | 62.0 | 48.5 | 9.0 | |
| | 100–74μ | 36.5 | 48.0 | | |
| | Under 74μ | | | 91.0 | |
| Result of the test | Average disintegration time (seconds | 120 | 90 | 60 | over 300 |
| Hardness (Kg) | | 8.8 | 11.5 | 13.2 | 12.1 |

EXAMPLE 6.

Hydroxypropyl methylcellulose (M.S. of hydroxypropyl radical: 0.01, and M.S. of methoxyl group: 0.45, and exhibiting when dissolved in an amount of 2 to 10% aqueous solution of sodium hydroxide a viscosity of 15.3 cps. at 20°C) was pulverized in a vibratory ball mill, until at least 90% of it had a particle size of 246μ or less and it had an apparent density of 0.45 g/cc, whereby a Sample 13 was obtained or until at least 90% of it had a particle size of 74μ or less, and it had an apparent density of 0.60 g/cc, whereby a Sample 14 was obtained. The above-mentioned hydroxypropyl methylcellulose was dissolved in a 10% aqueous caustic soda solution and processed into a 0.1 mm thick film. The film was dried, then washed with water. It was again dried, then pulverized in a vibratory ball mill, until at least 90% of it had a particle size of 74μ or less, and it had an apparent density of 0.55 g/cc whereby a Sample 15 was obtained.

250 parts of lactose, 18 parts of polyethylene glycol, and 2 parts of calcium stearate were added to 30 parts of each of the Samples and to 30 parts of microcrystalline cellulose as a control. The mixtures thus prepared were tableted on a direct compression-type tableting machine (pressure: 300 kg/cm²) into 300 mg. tablets. The average disintegration time and hardness of the tablets were as given in Table 10.

Table 10

| Sample No. | Present invention | | | Control |
|---|---|---|---|---|
| | 13 | 14 | 15 | 16 |
| Apparent density (g/cc) | 0.45 | 0.60 | 0.55 | — |
| Particle distribution (%) Over 246μ | 4.5 | | | |
| 246 – 100μ | 65.0 | 5.4 | 8.8 | |
| 100 – 74μ | 22.0 | 91.1 | 89.0 | |
| Under 74μ | 3.5 | 3.5 | 2.2 | |
| Result of the test Hardness (kg) | 6.9 | 12.2 | 14.9 | 13.0 |
| Average disintegration time (sec) | 90 | 90 | 80 | Over 300 |

What is claimed is:

1. A medicament solid dosage form comprising a medicament and 1 to 50% by weight, based on the weight of the medicament solid dosage form, of a cellulose ether excipient selected from the group consisting of hydroxy alkylcellulose and hydroxyalkyl-alkylcellulose, in which the average total number of substituted moles of hydroxyalkyl groups and alkyl groups per anhydrous glucose unit is 0.1 to 1.30, the average number of substituted moles of hydroxyalkyl group per anhydrous glucose unit is 0.05 to 1.00, and the average number of substituted moles of alkyl groups per anhydrous glucose unit is 0 to 1.00.

2. The dosage form as claimed in claim 1 wherein the average total number of substituted moles of hydroxyalkyl groups and alkyl groups per anhydrous glucose unit is 0.2 to 1.0, the average number of substituted moles of hydroxyalkyl groups per anhydrous glucose unit is 0.10 to 0.80, and the average number of substituted moles of alkyl groups per anhydrous glucose unit is less than 0.80.

3. The dosage form as claimed in claim 1 wherein 10 to 30% by weight of the cellulose ether excipient is present.

4. The dosage form as claimed in claim 1 wherein said hydroxyalkyl cellulose is hydroxy propyl cellulose and the average number of substituted moles of hydroxyalkyl cellulose is 0.1 to 1.0.

5. The dosage form as claimed in claim 1, wherein said cellulose ether is a powdery material, at least 90% by weight of which has a particle size not exceeding 100μ, and the apparent desity of which is from 0.3 to 0.8 g/cc.

6. The dosage form as claimed in claim 1, wherein said cellulose ether is a powdery material at least 90% by weight of which has a particle size not exceeding 80μ and the apparent density of which is 0.5 – 0.8 g/cc.

7. The dosage form as claimed in claim 1 wherein said cellulose ether is selected from the group consisting of hydroxyethyl cellulose, hydroxypropylcellulose, hydroxybutyl ethylcellulose, hydroxybutyl methylcellulose, hydroxypropyl methylcellulose, hydroxypropylethylcellulose, hydroxyethyl ethylcellulose, hydroxyethyl methylcellulose and mixtures thereof.

* * * * *